No. 852,809. PATENTED MAY 7, 1907.
J. K. STEWART.
SHEEP SHEARING MACHINE.
APPLICATION FILED AUG. 13, 1906.
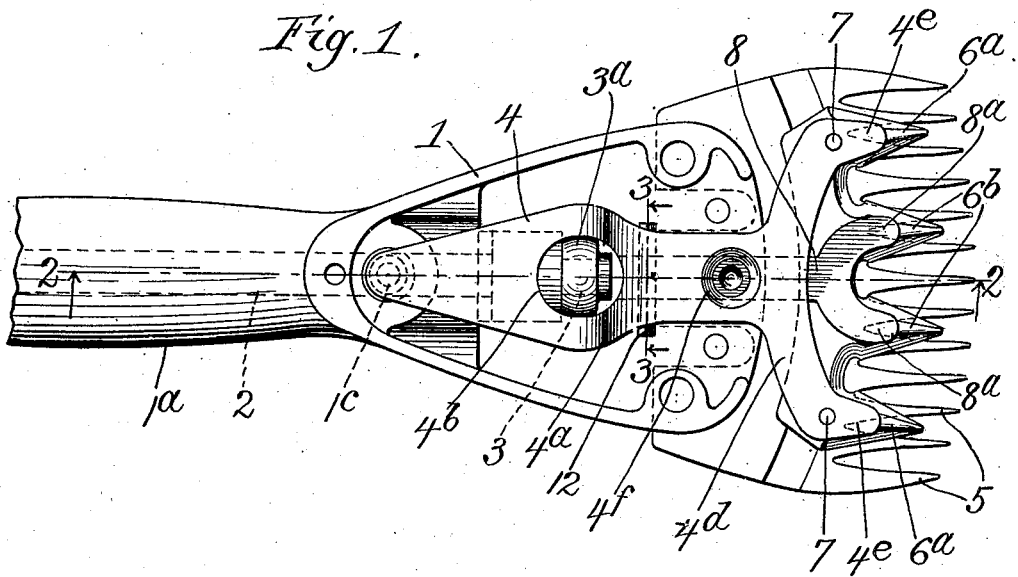
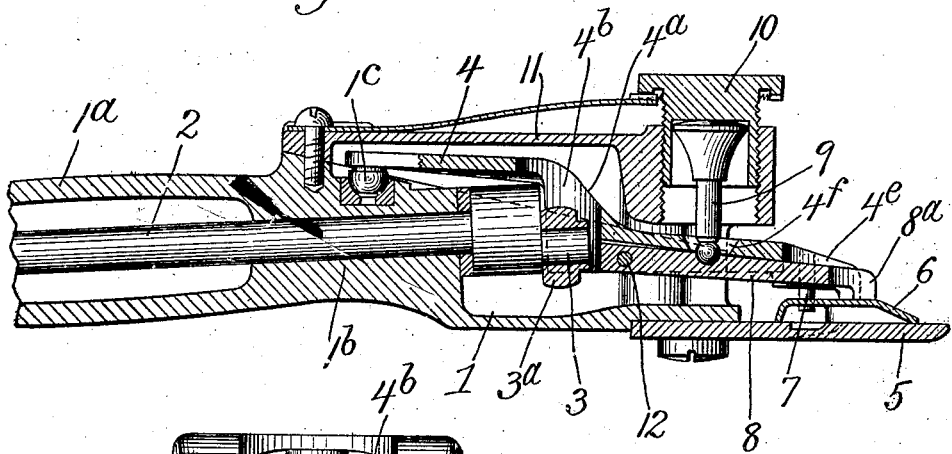
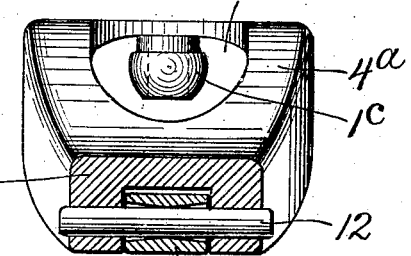
Witnesses.
Edward T. Wray.
M. Gertrude Ady
Inventor.
John K. Stewart
by Burton Burton
his Attys

UNITED STATES PATENT OFFICE.

JOHN K. STEWART, OF CHICAGO, ILLINOIS.

SHEEP-SHEARING MACHINE.

No. 852,809.     Specification of Letters Patent.     Patented May 7, 1907.

Application filed August 13, 1906. Serial No. 330,285.

*To all whom it may concern:*

Be it known that I, JOHN K. STEWART, a citizen of the United States, residing at Chicago, in the county of Cook and State of Illinois, have invented new and useful Improvements in Sheep-Shearing Machines, of which the following is a specification, reference being had to the accompanying drawings, forming a part thereof.

This invention relates to devices of the general class of animal shears which are hand-directed and power-driven, and it particularly relates to improvements in the class of shears especially adapted for sheep-shearing. It consists of the features of construction shown and described and set out in the claims.

In the drawings:—Figure 1 is a top plan view of a sheep shearing machine embodying my invention with the cap plate removed. Fig. 2 is a section at the line 2—2 on Fig. 1 through the entire shear, cap plate and adjusting screw being shown in place. Fig. 3 is a detail section at the line 3—3 on Fig. 1.

The customary parts of a tool or machine of this class are shown in conventional or familiar form comprising the housing or base, 1, which includes the handle piece, $1^a$, in which is journaled the driving shaft, 2, said shaft having at the forward end a crank, 3, which engages the vertical slot, $4^b$, in the shoulder, $4^a$, of the operating lever, 4, for oscillating said lever about its fulcrum, $1^c$, located above the forward bearing, $1^b$, of the shaft, 2. The crank, 3, has the customary anti-friction roll, $3^a$, for relieving the friction at its engagement with the operating lever, 4.

5 is the comb or fixed cutter plate which is mounted rigidly upon the under side of the base or housing, 1, at the forward end of the latter.

6 is the vibrating cutter. It is lodged upon the upper side of the comb or fixed cutter and engaged by two pins, 7, 7, projecting from the cross arm, $4^d$, of the operating lever, 4. The vibrating cutter has two extreme and two intermediate equally spaced teeth or cutting fingers, $6^a$ and $6^b$, respectively. It is necessary that all four of these teeth should be held with equal pressure on the comb or fixed cutter, and it is not sufficient for this purpose that the vibrating cutter is itself rigid, because the spring of the cutting teeth or fingers themselves of this cutter would permit them to be individually crowded off from the fixed cutter if not held individually on to the latter. The two extreme teeth or fingers, $6^a$, of the vibrating cutter are thus held by two fingers, $4^e$, $4^e$ projecting from the extremities of the cross arm, $4^d$, of the operating lever, 4, said fingers, $4^e$, bearing upon the upper side of the said extreme teeth, $6^a$, as far out toward the point of the teeth as practicable in view of their necessary taper at the end. For transmitting the pressure to the extreme teeth through the extreme fingers, $4^e$, and for applying the pressure to the intermediate teeth, there is provided a secondary pressure lever, 8, which is pivotally connec at its rear end with the operating lever, 4, a the under side of the latter and extends out under said operating lever, and at its forward end is forked, its two fingers, $8^a$, $8^a$, projecting between the two fingers, $4^e$, $4^e$, of the operating lever, 4, in position to bear upon the intermediate teeth, $6^b$, of the vibrating cutter, in the same manner as the fingers, $4^e$, bear upon the extreme teeth, $6^a$, of said cutter.

The pressure for holding the vibrating cutter on to the fixed cutter through the medium of the secondary lever, 8, and the vibrating lever is transmitted from a pressure pin or a "dolly", 9, which passes through an aperture, $4^f$, in the operating lever, and is stepped in the upper side of the secondary lever, 8, the head of said pressure pin or dolly extending up into the hollow tension screw, 10, which is screwed through the cap, 11, of the housing to press the dolly on to the secondary lever, which, in turn, presses the operating lever, 4, to which it is pivoted, on to the vibrating cutter. The relative location of the pivot of the operating lever at $1^c$, the pivot of the secondary lever, 8, to the operating lever, the point of the step bearing of the pressure pin on the secondary lever, and the points of bearing of the fingers, $4^e$ and $8^a$, of the operating lever and secondary lever, respectively, on the vibrating cutter, are such as to cause the pressure produced by the tension screw when it is screwed down on to the dolly, 9, to be distributed equally through the four fingers, $4^e$, $4^e$, $8^a$, $8^a$, to the four teeth of the vibrating cutter. But it will be observed that in order that such equal distribution provided for by the relative location of the points mentioned may not be prevented, both the levers, 4 and 8, must be free, not only to swing in vertical fore-and-aft plane for direct pressure of the vibrating cutter upon the fixed cutter, but also to rock about the fore-and-aft axis midway between the two fingers of each lever. These two movements of the operating lever are provided in addition to its oscillating movement by pivoting said lever at 1° in a ball-and-socket joint, as illustrated. Said two movements of the secondary lever, 8, in addition to its vibrating movement with the operating lever, 4, are provided for by making the pivot bearing of said secondary lever at its pivot to the operating lever hour-glass shaped,—that is, double-conical in form,—as seen in Fig. 3, so that the lever not only may swing about the axis of the pivot pin, 12, but may also rock about an axis at right angles to the axis of said pivot pin intersecting said axis at the narrowest point of said hour-glass-shaped bearing. The actual extent of each of these two movements of each of these two levers is very slight, and in action, imperceptible. It is the possibility of movement, however, which is essential to the result of causing each of the levers to press its two fingers equally upon the teeth of the vibrating cutter upon which they respectively rest. Satisfactorily operative, shears of this class have therefore generally been made with only three teeth, and since the vibrating stroke is necessarily short and its range cannot be increased beyond a certain low minimum without interfering with the steadiness of the tool or the rate of its operation, or requiring undue amount of power, the breadth of the cut possible has been practically limited to twice the unit distance between the consecutive teeth of such triple-toothed cutter. By providing the secondary pressure lever with two fingers, and by giving it the capacity for rocking so as to equalize the pressure of these fingers and thus making it possible to use a cutter with two intermediate teeth instead of one, as heretofore, the capacity of the tool is increased substantially fifty per cent. without increasing the range of the vibrating stroke, and therefore without sacrificing any of the advantages of the short stroke.

I claim:—

1. A shear comprising a comb or fixed cutter and a vibrating cutter; an operating lever having two fingers bearing upon the vibrating cutter; a secondary lever pivoted to the operating lever and having two fingers intermediate those of the operating lever bearing upon the vibrating cutter, both said levers being pivoted for movement relative to the part to which it is pivoted about two axes, one at right angles to the axis of the vibrating movement of the operating lever, and the other transverse to the first, and means for applying pressure to the secondary lever.

2. A shear comprising a comb or fixed cutter and a vibrating cutter mounted thereon; an operating lever for vibrating the vibrating cutter having two points of pressure thereon; a secondary lever pivoted to the operating lever and having two points of pressure on the vibrating cutter; a pressure or tension screw and means by which it communicates pressure to the secondary lever between the pivot of the latter and its points of bearing on the vibrating cutter, the operating lever and the secondary lever being pivoted for two movements relative to the part to which it is pivoted, the first in a vertical plane at right angles to the plane of vibration of the vibrating cutter, and the second about an axis transverse to the axis of the first movement.

3. A shear comprising a comb or fixed cutter and a vibrating cutter operating thereon; an operating lever for actuating the vibrating cutter having two points of bearing thereon and mounted for universal movement about its fulcrum; a secondary lever pivoted to the operating lever and having two points of bearing upon the vibrating cutter; a tension or pressure screw and means by which it transmits pressure to the secondary lever intermediate its fulcrum and its points of bearing on the cutter, said secondary lever being mounted on the operating lever for pivotal movement about an axis parallel to the plane of vibration of the cutter, and also about an axis at right angles to the first.

4. A sheep shear comprising a comb or fixed cutter, a vibrating cutter having four equally spaced cutting teeth; an operating lever for actuating the vibrating cutter having fingers bearing upon the two extreme teeth of said lever; a secondary lever pivoted to the operating lever and having fingers bearing upon the intermediate teeth of said lever, both the levers being mounted for rocking movement relative to the part to which it is pivoted about an axis radial to the path of vibration of the cutter and midway between the said fingers of the respective levers.

In testimony whereof, I have hereunto set my hand at Chicago, Illinois, this 10th day of August, 1906.

JOHN K. STEWART.

In presence of—
CHAS. S. BURTON,
M. GERTRUDE ADY.